US012442415B2

(12) United States Patent
Nakao

(10) Patent No.: US 12,442,415 B2
(45) Date of Patent: Oct. 14, 2025

(54) CAGE AND BALL BEARING

(71) Applicant: NTN CORPORATION, Osaka (JP)

(72) Inventor: Goro Nakao, Shizuoka (JP)

(73) Assignee: NTN CORPORATION, Osaka (JP)

( * ) Notice: Subject to any disclaimer, the term of this patent is extended or adjusted under 35 U.S.C. 154(b) by 113 days.

(21) Appl. No.: 18/280,083

(22) PCT Filed: Mar. 3, 2022

(86) PCT No.: PCT/JP2022/009175
§ 371 (c)(1),
(2) Date: Sep. 1, 2023

(87) PCT Pub. No.: WO2022/186342
PCT Pub. Date: Sep. 9, 2022

(65) Prior Publication Data
US 2024/0151269 A1 May 9, 2024

(30) Foreign Application Priority Data
Mar. 4, 2021 (JP) ................. 2021-034476

(51) Int. Cl.
*F16C 33/41* (2006.01)
(52) U.S. Cl.
CPC .......... *F16C 33/416* (2013.01); *F16C 33/418* (2013.01)
(58) Field of Classification Search
CPC ...... F16C 33/41; F16C 33/412; F16C 33/414; F16C 33/416; F16C 33/418
See application file for complete search history.

(56) References Cited

U.S. PATENT DOCUMENTS

| 2008/0085070 A1* | 4/2008 | Hirata | C08J 9/26 384/470 |
| 2013/0163909 A1* | 6/2013 | Sakaguchi | F16C 33/418 384/523 |
| 2018/0106295 A1* | 4/2018 | Koda | F16C 33/3887 |

FOREIGN PATENT DOCUMENTS

| DE | 102005028756 A1 * | 1/2007 | ............ F16C 33/416 |
| JP | 6-59627 | 8/1994 | |
| JP | 2012013094 A * | 1/2012 | .......... F16C 33/3856 |
| JP | 2012-236363 | 12/2012 | |

(Continued)

OTHER PUBLICATIONS

Machine Translation of DE-102005028756-A1 (Year: 2007).*
Machine Translation of JP-2012013094-A (Year: 2012).*
Machine Translation of JP-2012236363-A (Year: 2012).*

*Primary Examiner* — Alan B Waits
(74) *Attorney, Agent, or Firm* — Wenderoth, Lind & Ponack, L.L.P.

(57) ABSTRACT

A cage is provided which is less likely to be deformed by a centrifugal force, and in which the strength of a weld is less likely to decrease. Each horn portion includes a base wall axially connected to a ring portion, and located between pockets, and a pair of claws separated from each other. The pair of claws each has a pocket inner surface facing the pocket, and an opposed surface on the side opposite from the pocket inner surface. The base wall includes a pair of connection portions axially connecting the respective claws to the ring portion, and an intermediate portion circumferentially connecting the connection portions to each other. A weld is disposed in a resin area consisting of one of the claws, one of the connection portions, and a circumferential section of the ring portion.

11 Claims, 6 Drawing Sheets

(56) References Cited

FOREIGN PATENT DOCUMENTS

| JP | 2012236363 A | * 12/2012 |
| JP | 2015-197210 | 11/2015 |
| JP | 2016-169766 | 9/2016 |
| JP | 2019-199915 | 11/2019 |
| JP | 2020-046069 | 3/2020 |

* cited by examiner

CAGE AND BALL BEARING

TECHNICAL FIELD

The present invention relates to a cage integrally formed by injecting a synthetic resin into a mold.

BACKGROUND ART

As such a cage, there is a cage including a ring portion extending in a circular annular shape; and a plurality of horn portions disposed at uniform intervals in the circumferential direction, and protruding from the ring portion toward the one axial side, the ring portion and the plurality of horn portions being integrally formed by injection molding. Pockets of the cage that are each surrounded from three sides by the circumferentially adjacent horn portions and the ring portion are used as spaces in which rolling elements are received. The rolling elements and the cage are bearing components partially constituting a rolling bearing. The rolling elements received in the pockets are disposed between the inner and outer raceways of the rolling bearing.

If such a cage is used in a ball bearing that rotates at a high speed, a countermeasure is taken to reduce deformation of the horn portions due to a centrifugal force. As the countermeasure, the volumes of the horn portions are reduced by forming, in each horn portion, a pair of claws protruding toward the one axial side such that a recessed space is defined in the horn portion. Therefore, the cross-sectional area of the resin portion constituting each horn portion and the ring portion is reduced at the circumferential area where a recessed bottom surface connecting the roots of the pair of claws to each other is located (e.g., the below-identified Patent Documents 1 and 2).

PRIOR ART DOCUMENT(S)

Patent Document(s)

Patent Document 1: Japanese Unexamined Patent Application Publication No. 2020-46069
Patent Document 2: Japanese Unexamined Patent Application Publication No. 2015-197210

SUMMARY OF THE INVENTION

Problems to be Solved by the Invention

A cage formed by injection molding has welds formed where flows of molten resin injected into a mold meet. Since, at the welds, the flows of the molten resin that meet are not completely mixed together and solidified, the strength is relatively weak. In the cage of each Patent Document 1, 2, welds are disposed near the pocket bottoms of the ring portion, or on the recessed bottom surfaces of the horn portions.

However, since a one-side resin portion cross-sectional area of the cage is the smallest at the cross section including a pocket bottom, it is not preferable that welds are disposed near the pocket bottoms.

Also, if a weld is disposed on the recessed bottom surface of each horn portion, the resin orientation at the weld becomes vertical relative to resin flows, and the strength of the weld decreases. That is, the boundary where resin flows meet (weld line) becomes a clear weld, and breakage from the weld is likely to occur. In view of a reduction in strength at the weld, during high rotation, the strength of the cross section on the recessed bottom surface having the weld could be insufficient relative to the smallest cross section on the pocket bottom. Especially the higher the strength of a synthetic resin is, the lower the strength of a weld tends to be. Therefore, if the strength of the synthetic resin is high, the strength of the weld will decrease markedly, thus increasing the likelihood that a sufficient strength will not be ensured.

In view of the above, it is an object of the present invention to provide a cage which includes horn portions and a ring portion that are integrally formed of a synthetic resin, and in which not only are the horn portions less likely to be deformed by a centrifugal force, but also the strength of a weld is less likely to decrease.

Means for Solving the Problems

In order to achieve the above object, the present invention provides a cage comprising: a ring portion extending in a circular annular shape; and a plurality of horn portions disposed at uniform intervals in a circumferential direction, and protruding from the ring portion toward one axial side, the ring portion and the plurality of horn portions being integrally formed by injection molding of a synthetic resin, wherein rolling elements are received, respectively, in pockets of the cage that are each surrounded from three sides by the ring portion and a corresponding circumferentially adjacent pair of the horn portions, characterized in that the ring portion has pocket bottoms defining deepest portions of the respective pockets on the other axial side, wherein each of the horn portions comprises: a base wall axially connected to the ring portion, and located between, and circumferentially connected to, a corresponding circumferentially adjacent pair of the pockets; and a pair of claws circumferentially separated from each other, and protruding from the base wall toward the one axial side, the pair of claws each having: a pocket inner surface facing a corresponding one of the pockets; and an opposed surface located on a side circumferentially opposite from the pocket inner surface, the base wall comprising: a pair of connection portions axially connecting the respective claws to the ring portion; and an intermediate portion circumferentially connecting the connection portions to each other, and wherein a weld formed during the injection molding is disposed in a resin area consisting of one of the claws, one of the connection portions axially connected to the one of the claws, and a circumferential section of the ring portion axially connected to the one of the connection portions.

According to the above arrangement, by defining a recessed space between the opposed surfaces of the pair of claws of each horn portion, it is possible to reduce the volume of the horn portion, and reduce deformation of the horn portion due to a centrifugal force. Also, during injection molding, after a resin in a molten state flowing from one circumferential side to the other circumferential side passes through the filling area for forming one of the pocket bottoms, and also a resin in a molten state flowing from the other circumferential side to the one circumferential side passes through the filling space for forming the intermediate portion of the base wall of one of the horn portions, these resins meet in the wide filling space for integrally forming one of the claws, one of the connection portions and the ring portion, thereby forming a weld. Since this wide filling space has an axially markedly large cross-sectional area to form the pocket inner surface and the opposed surface of the one claw, the resin flows are likely to be disturbed, and are less likely to become a clear weld in the resin area solidified, which is effective in making the strength of the weld less likely to decrease. Also, the weld is formed not vertically but obliquely relative to the resin flows, and thus the cross section of the weld W is large, which is effective in increasing the strength of the weld. Due to this, the strength of the weld is less likely to decease.

It is preferable that the opposed surface of each of the pair of claws includes a corner surface portion extending to one of the pair of connection portions that is axially connected to the claw, from a position displaced from the one of the pair of connection portions toward the one axial side so as to bend, in a direction away from the pocket inner surface, toward the other axial side, and when considering, on an outer periphery of the resin area having the weld, a positional relationship between the weld and the corner surface portion based on a first imaginary plane including a center axis of the ring portion, the weld is disposed not to protrude toward the corner surface portion beyond the first imaginary plane, which includes one point circumferentially closest to the corresponding one of the pockets in the corner surface portion. With this arrangement, the stress concentrating on the root of the claw is alleviated by the corner surface portion, and also the weld is formed to avoid the corner surface portion, in which stress is relatively high.

It is preferable that when considering, on the outer periphery of the resin area having the weld, a positional relationship between the weld W and the pocket inner surface based on a second imaginary plane including the center axis of the ring portion, the weld is disposed not to protrude toward the pocket inner surface beyond the second imaginary plane, which includes, of the pocket inner surface, a boundary point between the base wall and the pocket inner surface. The weld lengthens on the outer periphery of the resin area due to the difference in peripheral length between the inner and outer peripheries of the cage. Since the boundary point between the pocket inner surface of the claw and the base wall on the outer periphery is the proximal end of the claw on the outer periphery, the above cross-sectional area increases axially markedly therefrom. Therefore, on the outer periphery of the resin area where the weld lengthens relatively, the weld becomes unclear and is less likely to decrease in strength.

It is preferable that when considering a one-side resin cross section cut by an imaginary plane including the center axis of the ring portion, a cross-sectional area A2 of the one-side resin cross section of the ring portion and the intermediate portion which is a smallest cross-sectional area at any circumferential position including the intermediate portion is less than 3 times a cross-sectional area A1 of the one-side cross-section including each of the pocket bottoms. By reducing the cross-sectional area A2 as described above, it is possible to reduce the volumes of the horn portions.

It is preferable that the cross-sectional area A2 is not more than twice the cross-sectional area A1. Due to this, it is possible to further reduce the volumes of the horn portions.

Each of the horn portions may include an ejected shaft protruding from between the pair of claws. If, of the space between the pair of claws, the portion close to a recessed bottom is narrow, when ejecting the cage from a mold, an ejecting pin for sticking the cage out of the mold interferes with the opposed surfaces of the pair of claws, and cannot properly stick the intermediate portion of the base wall. If the injected shaft is formed, it is possible to bring the ejecting pin into abutment with the ejected shaft, and eject the cage. Therefore, the present invention is also applicable to a cage having a small outer diameter.

The kind of the synthetic resin is not particularly limited. For example, as the synthetic resin, a thermoplastic resin may be used, or a thermosetting resin may be used.

The position of a gate when the injection molding is performed, i.e., a gate mark formed in the cage by the injection molding may be disposed, e.g., on a surface of the cage defining inner diameters or outer diameters of the ring portion and the horn portions.

Since the horn portions are less likely to deform and the strength of the weld is less likely to decrease, a ball bearing is suitable for high-speed rotation which comprises: the cage of the present invention; an inner ring; an outer ring; and the rolling elements received in the respective pockets while being disposed between the inner ring and the outer ring.

Effects of the Invention

In the cage of the present invention, of which the horn portions and the ring portion are integrally formed of a synthetic resin, due to the above-described structure, not only are the horn portions less likely to be deformed by a centrifugal force, but also the strength of a weld is less likely to decrease.

BEST MODE FOR CARRYING OUT THE INVENTION

Figure 1:
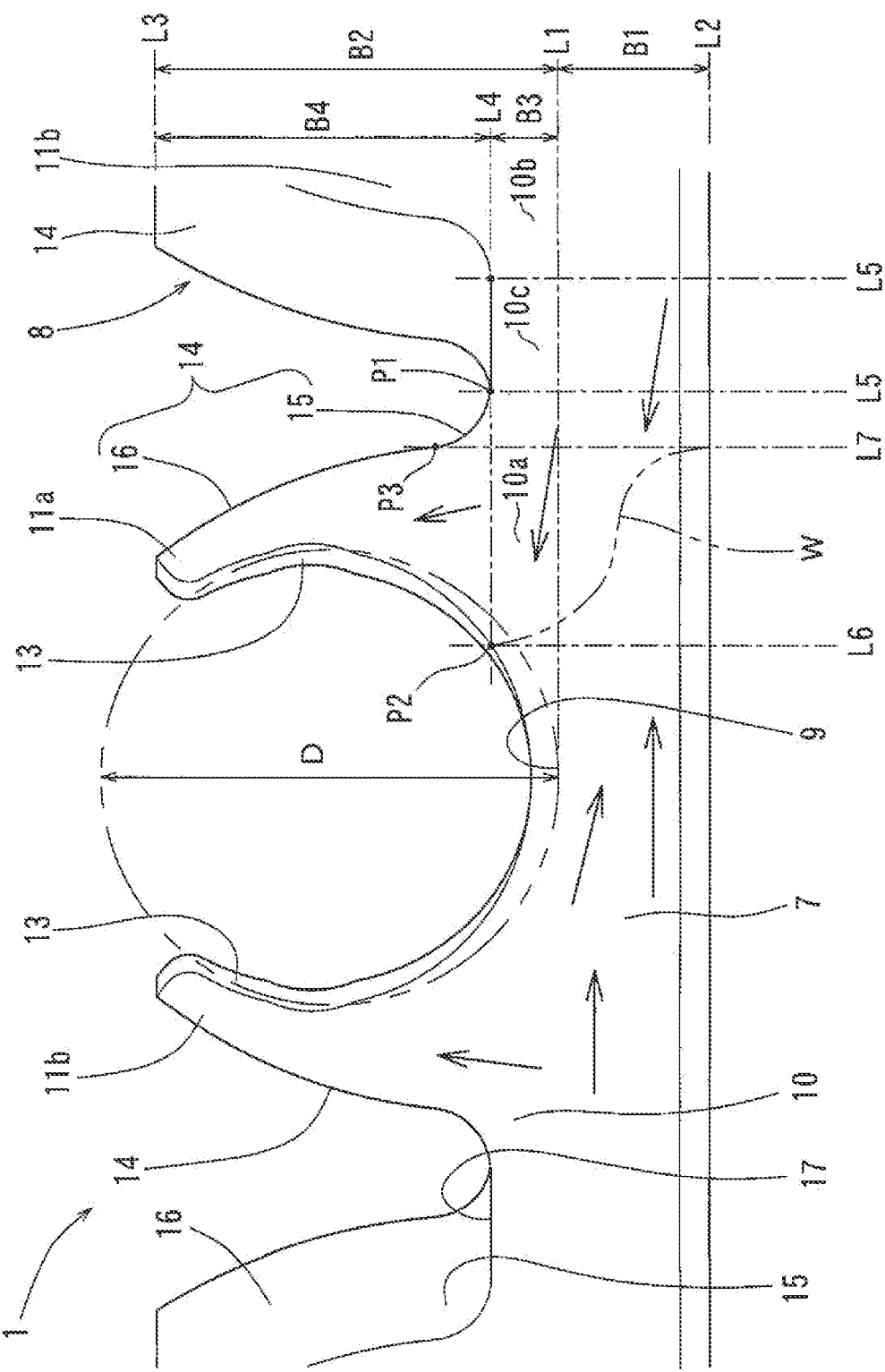
FIG. 1 is an enlarged front view illustrating a pocket of a cage according to a first embodiment of the present invention and the vicinity of the pocket, from the radially outer side.

The first embodiment as an example of the present invention is described below with reference to FIGS. 1 to 5, which is attached hereto.

The cage 1 shown in FIGS. 1 to 5 is a bearing component by which a plurality of rolling elements 4 disposed between an inner ring 2 and an outer ring 3 are arranged at uniform intervals in the circumferential direction. The rolling elements 4 are disposed in a single row in the circumferential direction between the inner raceway 5 of the inner ring 2 and the outer raceway 6 of the outer ring 3. The rolling elements 4 are balls.

Figure 2:
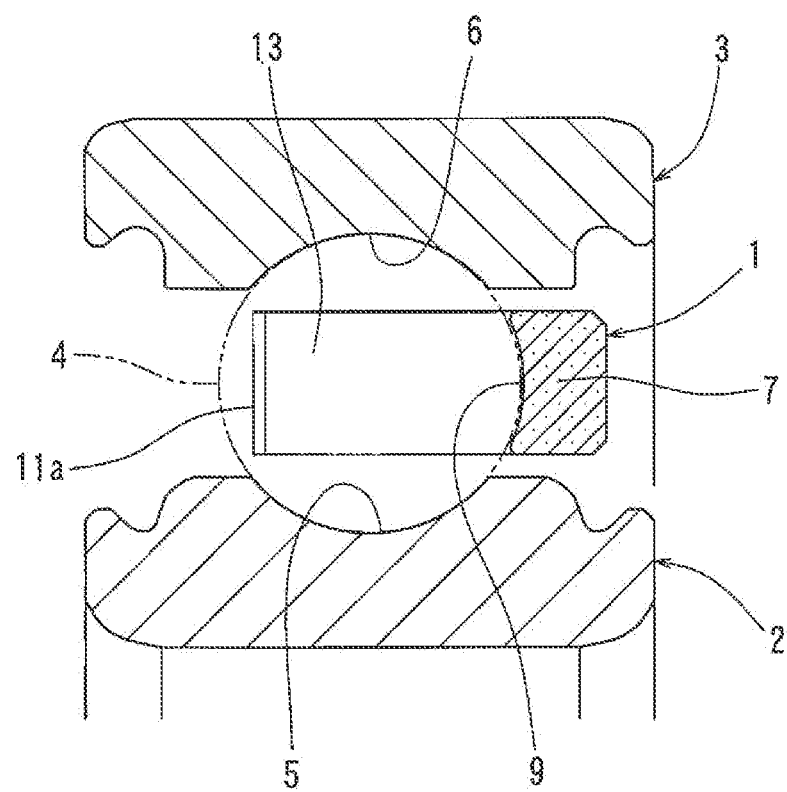
FIG. 2 is a sectional view of a ball bearing according to the first embodiment of the present invention.

In FIG. 2, the cage 1, the inner ring 2 and the outer ring 3 are arranged on a common center axis (not shown) and this common center axis corresponds to the rotation center axis of the ball bearing in design. The center axis of the cage 1 is hereinafter simply referred to as the "center axis".

As used herein, the terms "axial" and "axially" are related to two axially opposite directions along the center axis of which "one" corresponds to the leftward direction in FIG. 2, while "the other" corresponds to the rightward direction in FIG. 2. The terms "radial" and "radially" are related to directions perpendicular to the center axis of which, the term "radially outer (side)" is related to the directions radially away from the center axis, i.e., the upward direction in FIG. 2, while the term "radially inner (side)" is related to the directions radially toward the center axis, i.e., the downward direction in FIG. 2. The terms "circumferential" and "circumferentially" are related to the directions around the center axis. An imaginary plane perpendicular to the central axis is referred to as a "radial plane". An imaginary plane including the central axis is referred to as an "axial plane".

Figure 3:
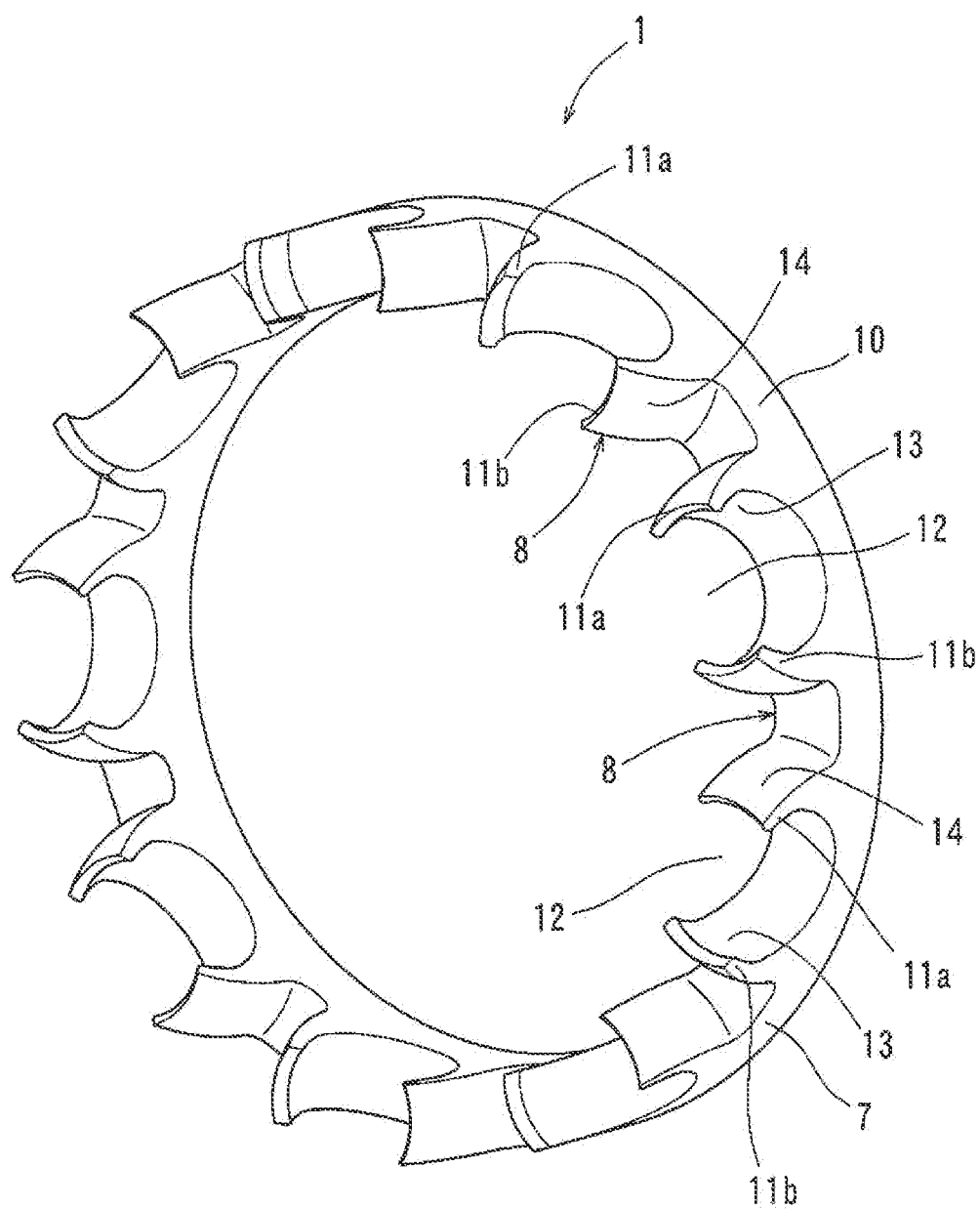
FIG. 3 is a perspective view of the cage of FIG. 1 when seen from the one axial side.
Figure 4:
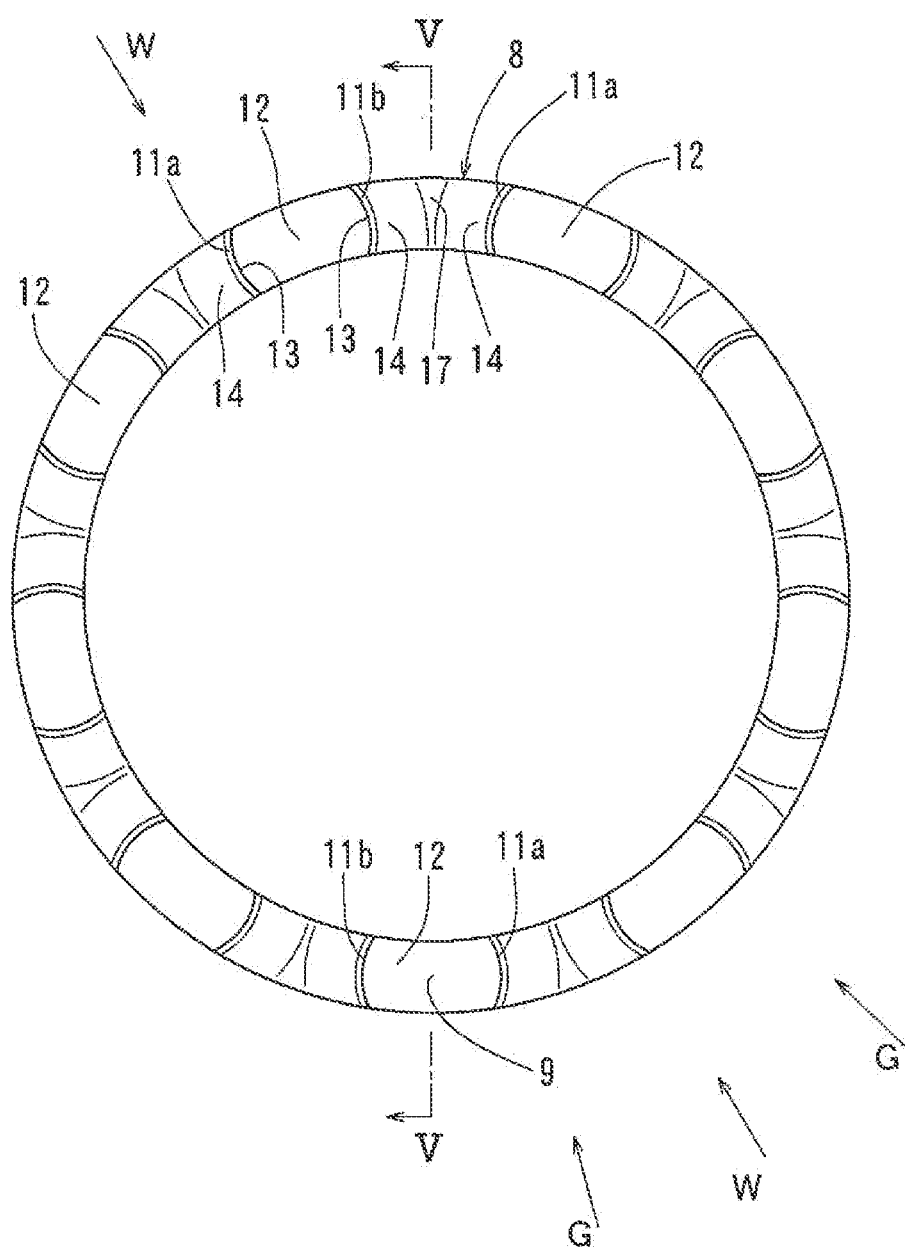
FIG. 4 is a side view of the cage of FIG. 1 on the one axial side.
Figure 5:
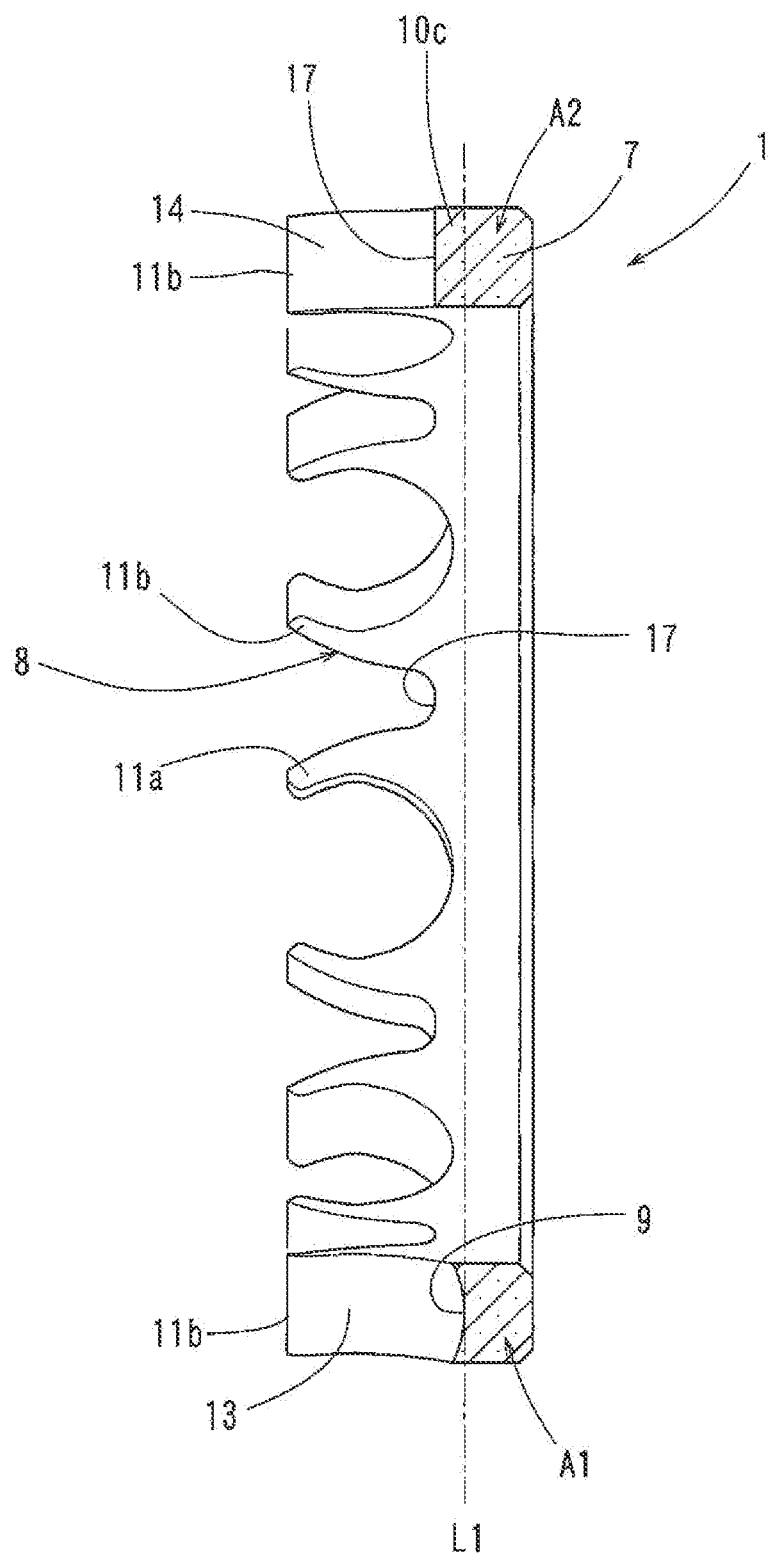
FIG. 5 is a sectional view taken along line V-V of FIG. 4.

As illustrated in FIGS. 3 to 5, the cage 1 is a molded component comprising a ring portion 7 extending in a circular annular shape; and a plurality of horn portions 8 protruding from the ring portion 7 toward the one axial side, at uniform intervals in the circumferential direction, the ring portion 7 and the plurality of horn portions 8 being integrally formed by injection molding of a synthetic resin. That is, the entire cage 1 is formed by injection molding.

The synthetic resin may be either a thermoplastic resin or a thermosetting resin, and may be either a crystalline resin or a non-crystalline resin, provided that it is usable for injection molding. Also, the synthetic resin may contain, in addition to the thermosetting resin or the thermoplastic resin as the main component, e.g., a different thermosetting or thermoplastic resin, rubber, glass fiber, carbon fiber, carbon black or graphite, as necessary.

The ring portion 7 is a resin portion extending continuously around the entire circumference. The horn portions 8 are resin portions having a cantilevered structure and protruding from the one axial side of the ring portion 7 into the open space.

The radially outer and inner surfaces of the ring portion 7 are both circumferentially extending cylindrical surfaces. The radially outer surfaces of the horn portions 8 and the ring portion 7 are flush with each other, and the radially inner surfaces thereof are also flush with each other. The outer and inner diameters of the cage 1 correspond to the diameters of the imaginary cylindrical surfaces, circumscribed and inscribed to the ring portion 7 and the horn portions 8, respectively.

The ring portion 7 has a plurality of pocket bottoms 9 exposed to the one axial side of the cage 1. The pocket bottoms 9 are arranged on the same circumference at uniform intervals in the circumferential direction. The pocket bottoms 9 are portions of the ring portion 7 that are located at the extreme end in the one axial direction of the ring portion 7. o. The ring portion 7 has the other end surface at the end of the cage 1 on the other axial side. The other end surface of the ring portion 7 is a flat surface extending radially around the entire circumference. The side surface of the cage 1 on the other axial side comprises the ring portion 7.

In FIGS. 1 and 5, the one-dot chain lines L1 to L4 designate radial planes, and the one-dot chain lines L5 to L7 designate axial planes, respectively. The radial plane L1, shown in FIGS. 1 and 5, axially touches the pocket bottoms 9 of the ring portion 7. The radial plane L2, shown in FIG. 1, axially touches the other end surface of the ring portion 7. The radial plane L3, shown in FIG. 1, axially touches the extreme ends of the horn portions 8 on the one axial side As illustrated in FIGS. 1 and 5, the resin portion constituting the ring portion 7 is present in the axial area B1 between the radial planes L1 and L2, and extends continuously around the entire circumference in the axial area B1.

The resin portions constituting the horn portions 8 are present in the axial area B2 between the radial planes L1 and L3, and do not extend continuously around the entire circumference in the axial area B2.

Each horn portion 8 includes a base wall 10 axially connected to the ring portion 7; and a pair of claws 11a and 11b protruding from the base wall 10 toward the one axial side.

The rolling elements 4 are received, respectively, in pockets 12 of the cage 1 such that each rolling element 4 is surrounded from three sides by the circumferentially adjacent horn portions 8 and the ring portion 7. That is, each pocket 12 opens radially outwardly, radially inwardly and in the one axial direction. Th number of the pockets 12 is the same as the number N of the horn portions 8. Each rolling element 4 is received in a respective one of the pockets 12. The cage 1 is shaped to have an n-fold rotational symmetry with respect to its center axis.

Each pocket 12 radially extends through the radially outer and inner surfaces of the cage 1, but, its radially inner and outer openings have diameters set such that the rolling element 4 cannot radially move out of the pocket 12. The cage 1 is a crown-shaped cage designed such that, with the rolling elements 4 disposed between the inner and outer raceways 5 and 6, by elastically deforming the horn portions 8 and circumferentially widening the openings of the pockets 12 on the one axial side, the rolling elements 4 are receivable into the respective pockets 12.

The resin surface defining each pocket 12 has a shape substantially along an imaginary spherical surface, and includes a contact area defining a pocket gap between the contact area and the rolling element 4. The cage 1 and the rolling elements 4 are movable freely relative to each other within the ranges of the pocket gaps. The center of the above imaginary spherical surface coincides with the center of the rolling element 4 on the diameter of the pitch circle of the rolling elements 4. The resin surface defining each pocket 12 is formed symmetrically with respect to the imaginary plane including the center of the resin surface and the center axis.

With the rolling elements 4 disposed between the inner and outer raceways 5 and 6, by axially pushing the claws 11a and 11b from their distal ends against the rolling elements 4, the claws 11a and 11b are elastically deformed, and the openings of the pockets 12 on the one axial side are widened, so that the rolling elements 4 are each received into the pocket between the adjacent horn portions 8.

Each pocket bottom 9 of the ring portion 7 defines the deepest portion of the pocket 12 on the other axial side. In other words, the pocket bottom 9 is, of the resin surface defining the pocket 12, the deepest portion on the other axial side. The spherical diameter D of the above imaginary spherical surface is shown in FIG. 1. The pocket bottom 9 is located at one end of the spherical diameter D.

The base wall 10 of each horn portion 8 is a resin portion located between, and circumferentially connected to, the circumferentially adjacent pockets 12. The pair of claws 11a and 11b of each horn portion 8 comprise, respectively, a first claw 11a and a second claw 11b circumferentially separated from each other. The claws 11a and 11b are resin portions having a cantilevered structure protruding from the one axial side of the base wall 10 into the open space.

Defined between the claws 11a and 11b of each horn portion 8 is a recessed space having a depth from the claw distal ends in the other axial direction. Due to this, it is possible to reduce the volume of the horn portions 8 compared to a horn portion of which the recessed space is filled with a resin. By thus reducing the volume of the horn portion 8, it is possible to reduce the centrifugal force applied to the horn portion 8 during rotation of the cage 1, and thus to reduce deformation of the horn portion 8 due to the centrifugal force.

Each base wall 10 comprises a pair of connection portions 10a and 10b axially connecting the respective claws 11a and 11b to the ring portion 7; and an intermediate portion 10c circumferentially connecting the connection portions 10a and 10b to each other.

Each claw 11a, 11b has a pocket inner surface 13 facing the pocket 12; and an opposed surface 14 located on the side circumferentially opposite from the pocket inner surface 13.

The resin surface defining each pocket 12 comprises the pocket inner surface 18 of the first claw 11a of one (first horn portion 8) of the adjacent horn portions 8; the pocket inner surface 13 of the second claw 11b of the other horn portion 8 (second horn portion 8); and the pocket bottom 9 of the ring portion 7. The pocket bottom 9 is a single point, and the pocket inner surfaces 13 of the first and second claws 11a and 11b constitute the entire resin surface defining the pocket 12 other than the pocket bottom 9.

The opposed surface 14 of each claw 11a, 11b includes (i) a corner surface portion 15 extending to the connection portion 10a, 10b (axially connected to the claw 11a, 11b), from a position displaced from the connection portion 10a, 10b toward the one axial side while bending, in the direction away from the pocket inner surface 13, toward the other axial side; and (ii) a curved surface portion 16 extending from the corner surface portion 15 while bending, in the direction toward the pocket inner surface 13, toward the one axial side. The boundary between the corner surface portion 15 and the curved surface portion 16 forms an inflection. The circumferential width of the claw 11a, 11b is the largest at the root of the claw 11a, 11b, and gradually decreases toward the claw distal end.

The intermediate portion 10c of each base wall 10 has a recessed bottom surface 17 circumferentially connecting the roots of the pair of claws 11a and 11b to each other. The recessed bottom surface 17 is exposed on the side surface of the cage 1 on the one axial side. The recessed bottom surface 17 is a flat surface extending in the circumferential and radial directions.

The radial plane L4 is located to include the roots of the claws 11a and 11b on the radially outer surface of the cage 1. In other words, the radial plane L4 is located on the boundaries between the pocket inner surfaces 13 and the respective base walls 10 on the radially outer surface of the cage 1. Also, the radial plane L4 axially touches the recessed bottom surfaces 17.

The resin portion constituting each base wall 10 is present in the axial area B3 between the radial planes L1 and L4, and circumferentially continuously extends between the circumferentially adjacent pockets 12. The resin portions constituting each circumferentially adjacent pair of claws 11a and 11b are present in the axial area B4 between the radial planes L3 and L4, and are circumferentially separated from each other.

Each axial plane L5 includes the boundary point P1 between the recessed bottom surface 17 and the corner surface portion 15 on the radially outer surface of the cage 1. Each axial plane L6 in FIG. 1 includes the boundary point P2 between the pocket inner surface 13 and the base wall 10 on the radially outer surface of the cage 1.

On the radially outer surface of the cage 1, each connection portion 10a, 10b forms the resin surface of, of the area between the corresponding axial planes L5 and L6 (this area corresponds to the circumferential width of the claw 11a or 11b to which the connection portion is connected), the portion corresponding to the axial area B3. On the radially outer surface of the cage 1, each intermediate portion 10c forms the resin surface of, of the area between the circumferentially adjacent axial planes L5 (this area corresponds to the circumferential distance between the pair of connection portions 10a and 10b), the portion corresponding to the axial area B3.

Considering a one-side resin cross section when the cage 1 is cut by an axial plane at any circumferential position of the cage 1, the ring portion 7, which extends continuously around the entire circumference, is formed such that the one-side resin cross section thereof has the same shape regardless of the circumferential position of the cage 1.

The one-side resin cross sections refer to resin portion cross sections when the cage 1 is cut by axial planes within the radial ranges between the radially outer surface and the center axis of the cage 1.

A1 denotes the cross-sectional area of the one-side resin cross section when the cage 1 is cut by each axial plane including a respective one of the pocket surfaces 9. The one-side resin cross section of the cross-sectional area A1 corresponds to the resin cross section of the cage 1 shown in FIG. 2, and the resin cross section of the lower portion of the cage 1 shown in FIG. 5. The cross-sectional area A1 is any one-side resin cross section of the cage 1.

A2 denotes the cross-sectional area of the one-side resin cross section of the ring portion 7 and each intermediate portion 10c that is the smallest cross-sectional area at any circumferential position including the intermediate portion 10c. The one-side resin cross section having the smallest cross-sectional area A2 corresponds to the one-side resin cross section of the upper portion of the cage 1 shown in FIG. 5.

In order to reduce the axial thicknesses of the intermediate portions 10c, thereby reducing the volumes of the horn portions 8, the cross-sectional area A2 is set to less than 3 times the cross-sectional area A1. Especially in the shown example, the cross-sectional area A2 is set to not more than twice the cross-sectional area A1.

In FIG. 4, the circumferential positions of gates G from which a synthetic resin is injected are shown by radial arrows, and the circumferential positions of welds W formed in the cage 1 during injection molding are shown by radial arrows. When the cage 1 is ejected from the mold, the cage 1 is sheared from the resin in the gates G, so that gate marks are formed on the portions of the cage 1 corresponding to the positions of the gates G. The gate marks corresponding to the gates G may be disposed on the radially outer surface of the cage 1, or disposed on the radially inner surface of the cage 1.

The welds W are displaced from the one-side resin cross sections of the cross-sectional areas A2, shown on the upper side of FIG. 5, and the one-side resin cross sections of the cross-sectional areas A1, shown on the lower side of FIG. 5.

A resin area is now considered which consists of, as illustrated in FIG. 1, one claw 11a (or 11b); one connection portion 10a (or 10b) axially connected to the one claw 11a (or 11b); and the circumferential section of the ring portion 7 axially connected to the one connection portion 10a (or 10b). Such resin areas are present to be the same in number as the claws 11a and 11b of the cage 1, and are uniformly distributed in the circumferential direction, in the cage 1. Of the radially outer surface of the cage 1, the portion occupied by the outer periphery of one such resin area is, in the example of FIG. 1, located between the adjacent axial planes L5 and L6 in the circumferential direction, and located (in the axial areas B1 and B2) between the radial planes L2 and L3 in the axial direction.

The schematic line of each weld W on the radially outer surface of the cage 1 is shown by a two-dot chain line in FIG. 1. On the outer periphery of the resin area having the weld W, the weld W is disposed between the adjacent axial planes L5 and L6 in the circumferential direction.

Considering the positional relationship between the weld W and the corner surface portion 15 on the outer periphery of the resin area including the weld W, the weld W is disposed not to protrude toward the corner surface portion 15 beyond an axial plane 7 including one point P3 that is circumferentially closest to the pocket 12 in the corner surface portion 15. The one point P3 is the boundary point between the corner surface portion 15 and the curved surface portion 16 on the radially outer surface of the cage 1. The weld W is away from the corner surface portion 15 in the circumferential and axial directions.

Considering the positional relationship between the weld W and the pocket inner surface 13 on the outer periphery of the resin area having the weld W, the weld W is disposed not to protrude toward the pocket inner surface 13 beyond an axial plane 6 including, of the pocket inner surface 13, the boundary point P2 between the base wall 10 and the pocket inner surface 13. The weld W is away from the pocket bottom 9 by not less than D/4.

The positions and the number of the gates G, and the positions and the number of the welds W can be appropriately set such that if one weld W is formed in the cage 1, it is disposed in one of the resin areas, and if two or more welds W are formed in the cage 1, they are disposed in two or more of the resin areas. The number of the gates G and the number of the welds W can be appropriately determined based on whether the number N of the pockets 12 is an even number or an odd number. The number of the welds W is preferably as small as possible.

In the shown example, the number N of the pockets 12 is nine. Therefore, at least two gates G need to be disposed such that two welds W are disposed, respectively, in two areas between the two gates G. Otherwise, welds W cannot be formed in the above resin areas. If the number N of the pockets 12 is an odd number, as illustrated in FIG. 4, two gates G are disposed, respectively, at two locations (first and second locations) circumferentially separated from each other such that a first weld W can be formed between the gates G in the clockwise direction from the gate G at the first location to the gate G at the second location, and such that a second weld W can be formed between the gates G in the counterclockwise direction from the gate G at the first location to the gate G at the second location. That is, the cage 1 has two gate marks circumferentially separated from each other, and two welds W circumferentially separated from each other.

If the number N of the pockets 12 is an even number in the cage 1, a single gate G can be used such that one weld W is formed at a location 180 degrees displaced from the gate G. That is, the cage 1 has one gate mark and one weld W.

In the cage 1, since, as illustrated in FIG. 1, (i) each horn portion 8 includes a base wall 10 axially connected to the ring portion 7, and located between, and circumferentially connected to, the circumferentially adjacent pockets 12, and a pair of claws 11a and 11b circumferentially separated from each other, and protruding from the base wall 10 toward the one axial side; (ii) the claws 11a and 11b each has a pocket inner surface 13 facing the pocket 12, and an opposed surface 14 located on the side circumferentially opposite from the pocket inner surface 13; and (iii) the base wall 10 includes a pair of connection portions 10a and 10b axially connecting the respective claws 11a and 11b to the ring portion 7, and an intermediate portion 10c circumferentially connecting the connection portions 10a and 10b to each other, a recessed space is defined between the opposed surfaces 14 of the claws 11a and 11b of the horn portion 8, and thus the volume of the horn portion 8 is reduced, so that the horn portion 8 is less likely to be deformed by a centrifugal force.

In addition, in the cage 1, since the ring portion 7 has pocket bottoms 9 each defining the deepest portion of the pocket 12 on the other axial side, and at least one weld W formed during injection molding is disposed in at least one resin area consisting of one claw 11a, one connection portion 10a axially connected to the one claw 11a, and the circumferential section of the ring portion 7 axially connected to the one connection portion 10a, the strength of the weld W is less likely to decrease. That is, during injection molding of the cage 1, the resin around the weld W tends to flow as conceptually shown by a plurality of arrows in FIG. 1. Here, molten resin flowing, in the filling space for forming the ring portion 7, from one circumferential side to the other circumferential side is referred to as a first resin flow (flow from the left side to the right side in FIG. 1), and molten resin flowing, in the filling space for forming the ring portion 7, from the other circumferential side to the one circumferential side is referred to as a second resin flow (flow from the right side to the left side in FIG. 1). The first resin flow branches off into the filling space for forming the claw 11b; collides with the transfer surface for forming a portion near the pocket bottom 9; and reaches the filling space for forming the claw 11a after passing through the filling space of the cross-sectional area A1. Also, the second resin flow branches off into the filling space for forming the claw 11a after passing through the filling space of the cross-sectional area A2 for forming the intermediate portion 10c; collides with the transfer surface for forming a portion near the pocket bottom 9; and joins the first resin flow in the wide filling space for integrally forming the claw 11a, the connection portion 10a and the ring portion 7 (the above resin area). Therefore, each of the first and second resin flows tends to decrease in speed and also be disturbed near the filling space for forming the claw 11b or 11a, whereas, relative to the second resin flow, the first resin flow tends to relatively increase in speed near the transfer surface of the other end surface of the ring portion 7. Since such first and second resin flows meet in the filling space having an axially markedly large cross section to form the pocket surface 13 and the opposed surface 14 of the claw 11a, the resin flows are likely to be disturbed and mixed together, and are less likely to become a clear weld W in the resin area solidified. Also, the weld W tends to be formed not vertically but obliquely relative to the resin flows, and thus the cross section of the weld W is large. Therefore, in the cage 1, the strength of the weld W is high, and is less likely to decrease.

Also, in the cage 1, since (i) the opposed surface 14 of each claw 11a includes a corner surface portion 15 extending to the connection portion 10a (axially connected to the claw 11a), from a position displaced from the connection portion 10a toward the one axial side so as to bend, in the direction away from the pocket inner surface 13, toward the other axial side, and (ii) when considering, on the outer periphery of the resin area having a weld W, the positional relationship between the weld W and the corner surface portion 15 based on a first imaginary plane (axial plane) including the center axis of the ring portion 7, the weld W is disposed not to protrude toward the corner surface portion 15 beyond the first imaginary plane (axial plane L7) including one point P3 that is circumferentially closest to the pocket 12 in the corner surface portion 15, the stress concentrating on the root of the claw 11a is alleviated by the corner surface portion 15, and also the weld W is formed to avoid the corner surface portion 15, in which stress is relatively high, so that breakage from the weld W is prevented.

Also, in the cage 1, since when considering, on the outer periphery of the resin area having a weld W, the positional relationship between the weld W and the pocket inner surface 13 based on a second imaginary plane (axial plane) including the center axis of the ring portion 7, the weld W is disposed not to protrude toward the pocket inner surface 18 beyond the second imaginary plane (axial plane L6) including, of the pocket inner surface 13, the boundary point P2 between the base wall 10 and the pocket inner surface 13, during injection molding, the weld W is formed in, of the outer periphery of the circumferentially relatively long resin area, a filling space portion having an axially markedly large cross-sectional area, so that, on the outer periphery of the resin area where a relatively long weld W is formed, the weld W becomes unclear, and is less likely to decrease in strength.

Also, in the cage 1, since when considering a one-side resin cross section cut by an imaginary plane (axial plane) including the center axis of the ring portion 7, the smallest cross-sectional area A2 of the one-side resin cross section of the ring portion 7 and the intermediate portion 10c, which is the smallest cross-sectional area at any circumferential position including the intermediate portion 10c, is set to less than 3 times the cross-sectional area A1 of the one-side cross-section including the pocket bottom 9, the cross-sectional area A2 is reduced, and the volumes of the horn portions 8 are reduced accordingly.

The strength of a weld W is sometimes reduced to approximately ⅓ of the strength of an unwelded portion per unit cross-sectional area. Therefore, if a weld is disposed in the portion of the cross-sectional area A2 as in a conventional example, the cross-sectional area A2 is preferably set to not less than 3 times the cross-sectional area A1 when compared to the strength of the portion of the cross-sectional area A1 (pocket bottom). On the other hand, if, as described above, a weld is disposed in the resin area displaced from the portions of the cross-sectional areas A1 and A2 so as to make the strength less likely to decrease, even if the cross-sectional area A2 is less than 3 times the cross-sectional area A1, no problem occurs when the strengths of these cross-sectional areas are compared.

Also, in the cage 1, since the cross-sectional area A2 can be set to not more than twice the cross-sectional area A1, it is possible to further reduce the volumes of the horn portions 8.

Also, since, in the cage 1, the horn portions 8 are less likely to deform and the strength of at least one weld W is less likely to decease, a ball bearing including the cage 1 is suitable for high-speed rotation.

Figure 6:
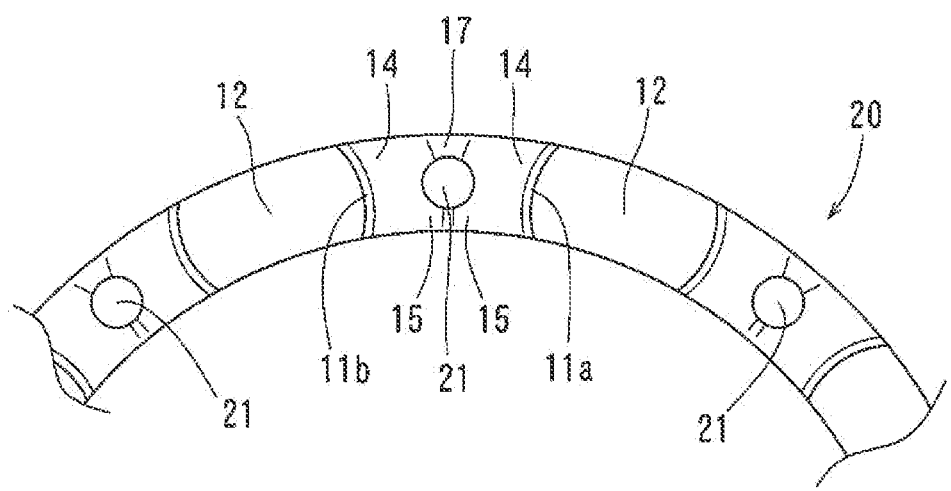
FIG. 6 is a partial side view, on the one axial side, of a cage according to a second embodiment of the present invention.
Figure 7:
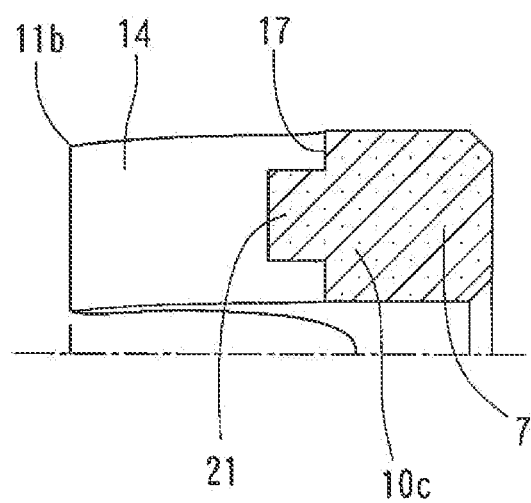
FIG. 7 is a partial enlarged sectional view illustrating a cut surface of the cage of FIG. 6 corresponding to that of the cage of FIG. 5.

The second embodiment of the present invention is now described with reference to FIGS. 6 and 7. Only the features of the second embodiment that are different from those of the first embodiment are described below.

Each horn portion 20 of the second embodiment includes an ejected shaft 21 protruding from between the pair of claws 11a and 11b. The ejected shaft 21 protrudes from the recessed bottom surface 17 and the corner surface portions 15 toward the one axial side. The ejected shaft 21 is a portion stuck by an ejecting pin when ejecting the cage from a mold, and has a stuck mark on its distal end surface.

Since, of the space between the pair of claws 11a and 11b, the portion close to the recessed bottom is narrow, when ejecting the cage from the mold, an ejecting pin for pushing the cage out of the mold interferes with the opposed surfaces 14 of the pair of claws 11a and 11b, and cannot push out the recessed bottoms surface 17 properly. By forming the injected shaft 21, it is possible to bring the ejecting pin into abutment with the ejected shaft 21, and eject the cage. Therefore, the present invention is also applicable to a cage in which the pitch between each adjacent pair of pockets 12 is narrow.

While the corresponding cross-sectional area is increased by the ejected shaft 21, if a weld is disposed therein, since stress concentrates on the root of the ejected shaft 21, the strength could decrease. Since the ejected shaft 21 between the adjacent pockets 12 is substantially not circumferentially connected to the adjacent pockets 12, the cross-sectional area of the ejected shaft 21 is not included in the cross-sectional area A2 when calculating the cross-sectional area A2.

The above-described embodiments are mere examples in every respect, and the present invention is not limited thereto. Therefore, the scope of the present invention is indicated not by the above description but by the claims, and should be understood to include all modifications within the meaning and scope equivalent to the scope of the claims.

DESCRIPTION OF REFERENCE NUMERALS

1: Cage
2: Inner ring
3: Outer ring
4: Rolling element
7: Ring portion
8, 20: Horn portion
9: Pocket bottom
10: Base wall
10a, 10b: Connection portion
10c: Intermediate portion
11a, 11b: Claw
12: Pocket
13: Pocket inner surface
14: Opposed surface
16: Corner surface portion
17: Recessed bottom surface
21: Ejected shaft

The invention claimed is:
1. A cage comprising:
a ring portion extending in a circular annular shape; and
a plurality of horn portions disposed at uniform intervals in a circumferential direction, and protruding from the ring portion toward one axial side, the ring portion and the plurality of horn portions being integrally formed by injection molding of a synthetic resin,
wherein rolling elements are received, respectively, in pockets of the cage that are each surrounded from three sides by the ring portion and a corresponding circumferentially adjacent pair of the horn portions,
wherein the ring portion has pocket bottoms defining deepest portions of the respective pockets on the other axial side, wherein each of the horn portions comprises:
   a base wall axially connected to the ring portion, and located between, and circumferentially connected to, a corresponding circumferentially adjacent pair of the pockets; and
   a pair of claws circumferentially separated from each other, and protruding from the base wall toward the one axial side,
wherein each claw of the pair of claws has:
   a pocket inner surface facing a corresponding one of the pockets; and
   an opposed surface located on a side circumferentially opposite from the pocket inner surface,
wherein the base wall comprises:
   a pair of connection portions axially connecting the respective claws to the ring portion; and
   an intermediate portion circumferentially connecting the connection portions to each other, and
wherein a weld formed during the injection molding is disposed in a resin area consisting of one of the claws, one of the connection portions axially connected to the one of the claws, and a circumferential section of the ring portion axially connected to the one of the connection portions, and
wherein, on an outer periphery of the resin area having the weld, a second imaginary plane includes a center axis of the ring portion, and a positional relationship between the weld and the pocket inner surface based on the second imaginary plane is such that the weld is disposed so as not to protrude toward the pocket inner surface beyond the second imaginary plane, wherein the second imaginary plane includes, of the pocket inner surface, a boundary point between the base wall and the pocket inner surface.

2. The cage according to claim 1, wherein the opposed surface of each claw of the pair of claws includes a corner surface portion extending to one of the pair of connection portions that is axially connected to the claw, from a position displaced from the one of the pair of connection portions toward the one axial side so as to bend, in a direction away from the pocket inner surface, toward the other axial side, and
   wherein on the outer periphery of the resin area having the weld, a first imaginary plane includes a center axis of the ring portion, and a positional relationship between the weld and the corner surface portion based on the first imaginary plane is such that the weld is disposed so as not to protrude toward the corner surface portion beyond the first imaginary plane, wherein the first imaginary plane includes one point circumferentially closest to the corresponding one of the pockets in the corner surface portion.

3. The cage according to claim 2, wherein in a one-side resin cross section cut by an imaginary plane including the center axis of the ring portion, a cross-sectional area A2 of the one-side resin cross section of the ring portion and the intermediate portion which is a smallest cross-sectional area at any circumferential position including the intermediate portion is less than 3 times a cross-sectional area A1 of the one-side cross-section including each of the pocket bottoms.

4. The cage according to claim 3, wherein the cross-sectional area A2 is not more than twice the cross-sectional area A1.

5. The cage according to claim 1, wherein in a one-side resin cross section cut by an imaginary plane including the center axis of the ring portion, a cross-sectional area A2 of the one-side resin cross section of the ring portion and the intermediate portion which is a smallest cross-sectional area at any circumferential position including the intermediate portion is less than 3 times a cross-sectional area A1 of the one-side cross-section including each of the pocket bottoms.

6. The cage according to claim 5, wherein the cross-sectional area A2 is not more than twice the cross-sectional area A1.

7. The cage according to claim 1, wherein each of the horn portions includes an ejected shaft protruding from between the pair of claws.

8. The cage according to claim 1, wherein a thermoplastic resin is used as the synthetic resin.

9. The cage according to claim 1, wherein a thermosetting resin is used as the synthetic resin.

10. The cage according to claim 1, wherein a gate mark formed by the injection molding is disposed on a surface of the cage defining inner diameters or outer diameters of the ring portion and the horn portions.

11. A ball bearing comprising:
   the cage according to claim 1;
   an inner ring;
   an outer ring; and
   the rolling elements received in the respective pockets while being disposed between the inner ring and the outer ring.

* * * * *